US012597076B1

(12) United States Patent
Aldahwi

(10) Patent No.: US 12,597,076 B1
(45) Date of Patent: Apr. 7, 2026

(54) DIGITAL-WITNESS ROBOTIC INSURANCE SYSTEM AND METHOD

(71) Applicant: Samara Aldahwi, Los Angeles, CA (US)

(72) Inventor: Samara Aldahwi, Los Angeles, CA (US)

( * ) Notice: Subject to any disclaimer, the term of this patent is extended or adjusted under 35 U.S.C. 154(b) by 0 days.

(21) Appl. No.: 19/300,864

(22) Filed: Aug. 15, 2025

(51) Int. Cl.
| | |
|---|---|
| *G06Q 40/08* | (2012.01) |
| *H04L 9/06* | (2006.01) |
| *H04L 9/32* | (2006.01) |
| *H04W 12/037* | (2021.01) |

(52) U.S. Cl.
CPC ......... *G06Q 40/0842* (2025.08); *G06Q 40/09* (2025.08); *H04L 9/0631* (2013.01); *H04L 9/3242* (2013.01); *H04W 12/037* (2021.01)

(58) Field of Classification Search
CPC .. G06Q 40/0842; G06Q 40/09; H04L 9/0631; H04L 9/3242; H04W 12/037
See application file for complete search history.

(56) References Cited

U.S. PATENT DOCUMENTS

| | | | | | |
|---|---|---|---|---|---|
| 10,482,594 | B2 * | 11/2019 | Potter | ..................... | G06T 7/001 |
| 10,872,381 | B1 * | 12/2020 | Leise | ................. | H04W 12/009 |
| 11,005,828 | B1 * | 5/2021 | Kapp | ..................... | G06F 21/64 |

(Continued)

*Primary Examiner* — Yingying Zhou
(74) *Attorney, Agent, or Firm* — IP Consulting Group; Michael Razavi; Alfred F. Hoyte, Jr.

(57) ABSTRACT

A robotic insurance platform is disclosed that transforms an autonomous service robot into a tamper-resistant "digital witness" capable of supplying legally probative evidence without human intervention. The robot is equipped with surround video cameras, a spatial microphone array, an on-board processor, a cryptographically isolated secure enclave, a wireless communication module, and a rolling-buffer memory that retains encrypted audio-video data for a configurable period such as forty days. A companion mobile application enables an insured user to register, perform know-your-customer identity verification, and pair the robot with an insurance policy stored on a cloud server that hosts an claim-decision engine and policy database. Following explicit verbal consent from the user, the robot records continuously while performing ordinary tasks. When an incident is detected—either by on-board heuristics or by a user-initiated claim request—the processor extracts a time window surrounding the event, computes a cryptographic hash of the clip inside the secure enclave, and commits that hash as an immutable anchor to a permissioned or public blockchain ledger. Only after blockchain confirmation is the encrypted clip transmitted to the insurance server, where the claim-decision engine verifies integrity, applies machine-learning analytics to determine causation, and issues a coverage determination. Approved claims trigger repair dispatch, replacement shipment, or direct monetary reimbursement, while unclaimed data exceeding the retention interval are securely erased. The platform delivers objective, bias-free evidence, virtually eliminates false claims, and reduces end-to-end settlement time from weeks to minutes, thereby lowering operational costs for insurers and increasing transparency for policyholders.

17 Claims, 7 Drawing Sheets

(56) References Cited

U.S. PATENT DOCUMENTS

| | | | | |
|---|---|---|---|---|
| 11,349,669 | B1 * | 5/2022 | Floyd | H04L 9/3242 |
| 11,643,102 | B1 * | 5/2023 | Calmer | G06F 3/012 |
| | | | | 340/576 |
| 11,922,734 | B1 * | 3/2024 | Kellett | G07C 5/085 |
| 2018/0018723 | A1 * | 1/2018 | Nagla | H04L 63/102 |
| 2018/0167203 | A1 * | 6/2018 | Belenko | H04L 9/14 |
| 2019/0124290 | A1 * | 4/2019 | Yuan | H04N 5/772 |
| 2020/0186506 | A1 * | 6/2020 | Shockley | H04L 9/14 |
| 2020/0313903 | A1 * | 10/2020 | Yu | H04L 9/3073 |
| 2021/0081545 | A1 * | 3/2021 | Mulligan | G06F 9/45558 |
| 2021/0319632 | A1 * | 10/2021 | Dutta | G06V 20/59 |
| 2022/0066741 | A1 * | 3/2022 | Saarinen | H04L 9/0631 |
| 2023/0342861 | A1 * | 10/2023 | LeFebre | G06Q 30/0283 |
| 2023/0351518 | A1 * | 11/2023 | Amancha | G06Q 40/08 |
| 2024/0364524 | A1 * | 10/2024 | Wang | G06F 21/604 |
| 2024/0378680 | A1 * | 11/2024 | Border | G06Q 50/47 |
| 2024/0412720 | A1 * | 12/2024 | Vasylyev | G06F 16/90332 |
| 2025/0158975 | A1 * | 5/2025 | Norys | H04L 63/104 |
| 2025/0219846 | A1 * | 7/2025 | Dover | H04L 9/0866 |
| 2025/0233743 | A1 * | 7/2025 | Aldweesh | H04L 63/166 |

* cited by examiner

ROBOT HARDWARE STACK

Wireless Module 22

Rolling Buffer 24

Secure Enclave 20

Processor 16

Microphone Array 14

Surround Cameras 12

DIGITAL-WITNESS ROBOTIC INSURANCE SYSTEM AND METHOD

FIELD OF THE INVENTION

The present disclosure relates generally to autonomous robotics and, more particularly, to an integrated robotic insurance system that turns a service robot into a tamper-resistant "digital witness" for verified, unbiased claims handling.

BACKGROUND OF THE INVENTION

Recent advances in perception, navigation and manipulation have enabled mobile service-robots to migrate from controlled factory floors into dynamic domestic and commercial environments. Humanoid concierge units greet hotel guests, inventory robots patrol warehouse aisles, and autonomous cleaning machines roam shopping-mall hallways. While these machines increase productivity and convenience, they also introduce novel risk profiles: a vacuum-like robot may collide with an antique vase, a hospitality robot may overheat and start a minor fire, or a passer-by may intentionally damage an expensive retail robot for social-media notoriety. Because robots are often unsupervised, incidents can occur out of human view, making it difficult to reconstruct what actually happened and who is responsible.

Traditional property or liability insurance was designed around human witnesses and after-the-fact documentation—photographs, third-party statements, or police reports. When an insured party files a claim, the burden is on that party to supply credible evidence; adjusters then sift through heterogeneous materials that may be low-resolution, selectively edited, or even deliberately fabricated. The result is a labour-intensive process involving manual interviews, forensic site visits, and lengthy negotiations between claimants and insurers. Disputes over chain-of-custody and evidentiary integrity are common, driving up operational costs and delaying indemnification.

Robotics amplifies these shortcomings. Robots already possess a rich suite of sensors—cameras, LiDAR, microphones, inertial units—capable of providing a 360-degree, time-synchronized record of their surroundings. However, today these data are either discarded, overwritten, or stored in an unsecured manner that offers little evidentiary value. Absent tamper-resistant storage and cryptographic attestation, any footage that does survive can be challenged in court as forged or manipulated. Consequently, owners and insurers cannot easily leverage the robot's innate sensing capability to streamline claim validation.

Thus, a technical gap persists: there is a need for an integrated system that (i) continuously captures high-fidelity sensor data directly on the robot itself, (ii) seals that data against later modification via hardware-rooted cryptographic mechanisms, (iii) automatically detects anomalous or damaging events and extracts the relevant evidentiary clip, and (iv) transmits authenticated evidence to an insurer so that claims can be adjudicated rapidly—ideally in minutes, not weeks—without requiring the policyholder to assemble and upload external documentation.

DETAILED DESCRIPTION OF THE INVENTION

System Overview

Figure 1:
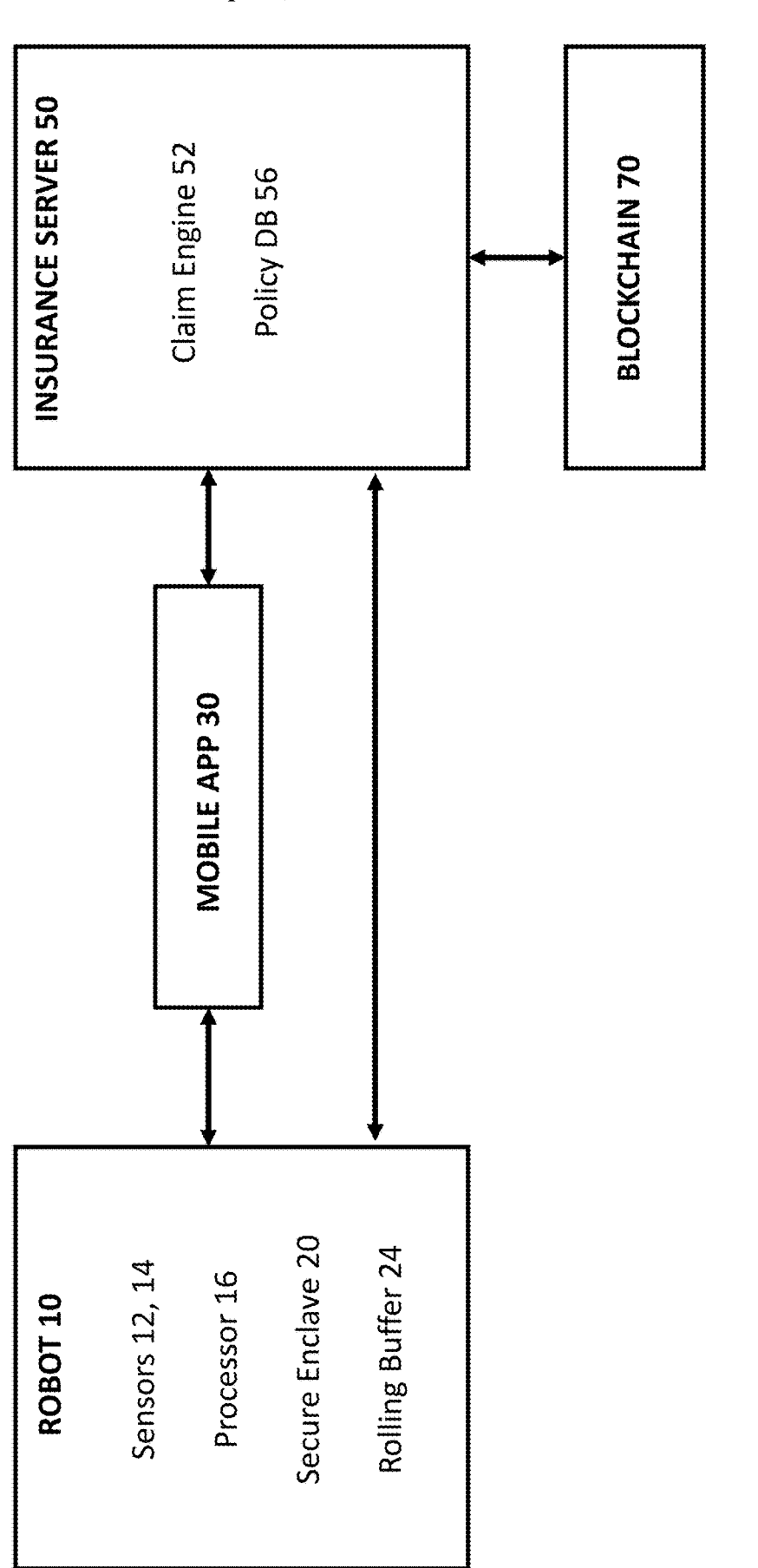
FIG. 1 is a high-level system block diagram showing robot (10), mobile app (30), insurance server (50), and blockchain (70).

As per FIG. 1—which is a high-level system block diagram—the digital-witness platform is partitioned into four cooperating domains: a robot domain, a mobile-client domain, a cloud-insurer domain, and a blockchain ledger. Directional arrows between the blocks illustrate the principal data flows that transform raw sensor streams into authenticated, insurer-actionable evidence.

Robot domain. Robot 10 encapsulates the sensing and trust stack embedded in the autonomous unit. Sensors 12, 14 denotes the surround video cameras 12 and beam-forming microphone array 14 that deliver 360-degree, time-synchronised coverage. Their outputs feed Processor 16, a heterogeneous system-on-chip running perception, compression and event-detection firmware. Secure Enclave 20 provides a hardware-isolated root of trust that stores private keys, signs clip hashes and responds to remote attestation. Rolling Buffer 24 is an encrypted circular flash store that preserves only the most recent N days (e.g., 40) of signed audio-video segments, thereby enforcing privacy while guaranteeing evidentiary freshness.

Mobile-client domain. Mobile App 30 represents the insured user's smartphone application. An arrow between the app and the Robot 10 depicts the local pairing workflow: scanning a QR code, transferring a session token, issuing firmware updates and submitting policy refresh commands—all protected by TLS.

Cloud-insurer domain. Insurance Server 50 aggregates back-office logic. Internal sub-block Claim Engine 52 executes machine-learning analytics on uploaded incident clips to determine causation, while Policy DB 56 stores user identity, coverage limits and adjudication outcomes. Robot 10 transmits encrypted, enclave-signed clips to Insurance Server 50; Server 50 delivers claim numbers, status updates and payout confirmations to Mobile App 30.

Blockchain ledger. Blockchain 70 symbolises a distributed ledger that holds immutable hash anchors. Insurance Server 50 transmits each secure-enclave-signed clip hash to Blockchain 70, where the hash is immutably time-stamped to form a tamper-evident audit trail; once the ledger returns its confirmation, the server records that acknowledgment in Policy DB 56 before commencing claim analysis.

Data-flow chronology. During routine operation, Robot 10 streams sensor data through Processor 16 into Rolling Buffer 24 while Secure Enclave 20 maintains a running hash chain. Upon anomaly detection or in response to a user command—such as (i) tapping Submit Claim within Mobile App 30, (ii) pressing a dedicated "Report Incident" button on the robot's chassis, or (iii) issuing a verbal instruction like "Bot, file a claim now", the processor extracts the pertinent clip, secures a digital signature from the enclave, and transmits the signed payload via a communication network to Insurance Server 50. The server anchors the hash on Blockchain 70, verifies integrity, and invokes Claim Engine 52 to perform adjudication, which may be implemented in any suitable manner, including automated processing, human evaluation, or a combination thereof. When a policy-mandated retention window lapses without a claim, aged sectors in Rolling Buffer 24 are cryptographically shredded, ensuring that no stale data remain on Robot 10.

Thus, FIG. 1 conveys at a glance how the four domains integrate to capture objective evidence at the edge, preserve its integrity in transit and at rest, and deliver near-real-time, bias-free insurance decisions to the policyholder.

Registration & Identity Verification

Figure 2:
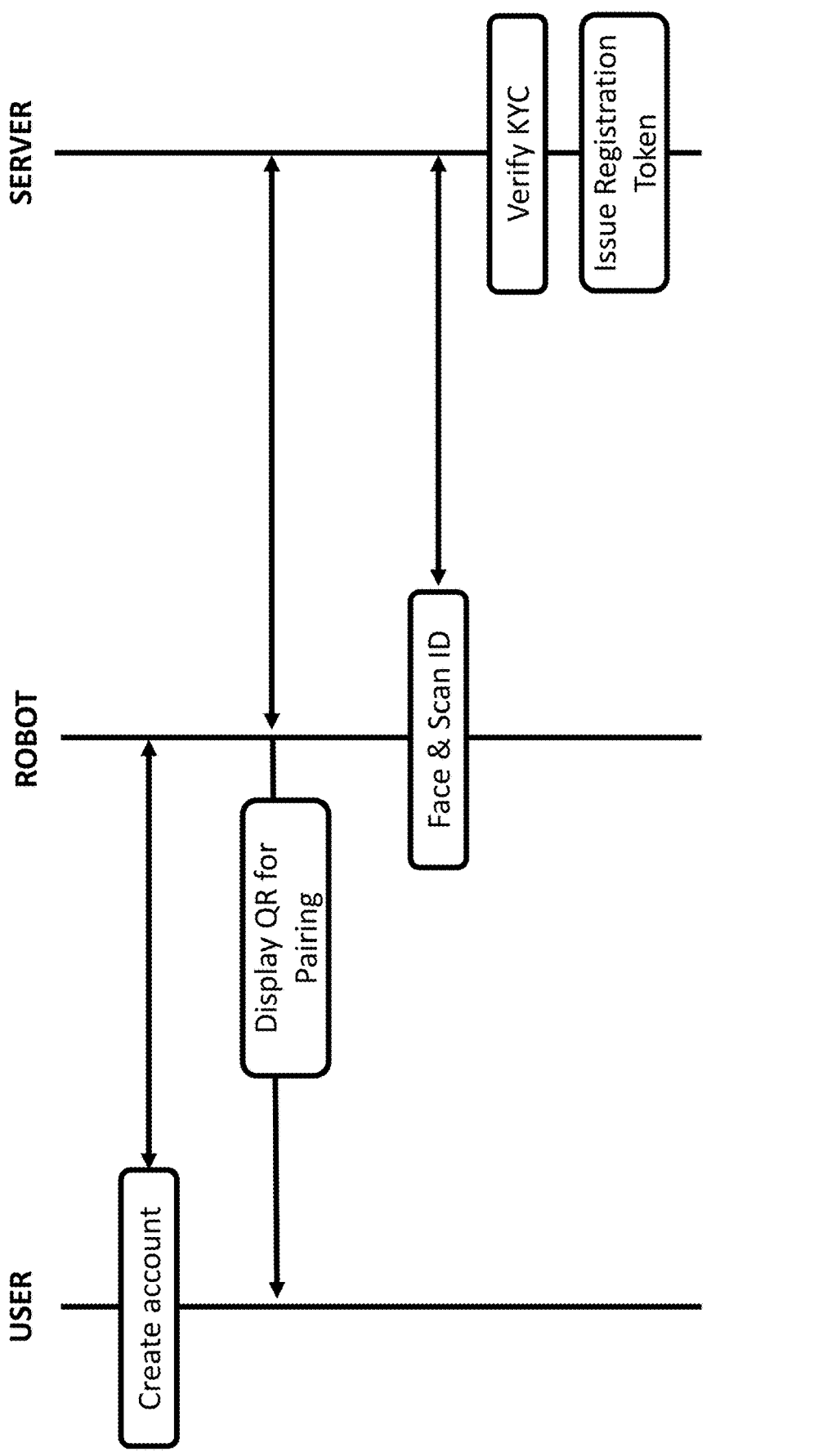
FIG. 2 is a swim-lane diagram of user registration, robot pairing, and know-your-customer (KYC) identity verification.

As per FIG. 2—which is a swim-lane diagram depicting parallel timelines for the User, Robot, and Server lanes—the platform orchestrates a secure, know-your-customer (KYC) registration workflow that binds a specific physical robot to a verified human policy-holder and to an insurance back end.

User lane. The process begins when the user launches Mobile App 30 and taps Create Account. The app requests legal name, address, and contact details, then instructs the user to position the phone's camera toward Robot 10. After successful account creation, the user must scan a machine-readable QR code presented on the robot's display. After the user scans the QR code, the mobile app explicitly requests government-issued ID information—full name, residential address, phone number and ID number—as part of the policy-holder profile that will be written into Policy DB 56 for downstream KYC and payout purposes.

Robot lane. In response to a local pairing command, Robot 10 generates a device-identifier payload—a cryptographically random value signed inside Secure Enclave 20—and renders it as the on-screen QR code. At the same moment, the robot transmits that same signed device-identifier payload to Insurance Server 50 allowing the back-end to pre-register the robot before the user completes the scan. Scanning the code supplies Mobile App 30 with both the device identifier and a short-lived pairing nonce, which the app transmits over the local network to the Robot 10, thereby completing mutual authentication. The robot then activates its surround cameras 12 and prompts, over speech synthesis, for the user to hold a government ID next to their face. Processor 16 performs liveness detection, optical character recognition of the ID, and face-to-ID matching. The resulting verification artefacts—JPEG frames, confidence scores, and the device identifier—are encrypted and forwarded along the swim-lane arrow to the cloud-based Insurance Server 50.

Server lane. Insurance Server 50 receives the artefacts and executes a full KYC check, which encompasses document validation against authoritative databases, cross-checking of facial biometrics, and sanction-list screening. When all checks succeed, the server issues a registration token, an HMAC-signed JSON object that embeds the customer ID, device identifier, and policy tier. Although the return path is not explicitly drawn in FIG. 2, the server transmits this token back to Robot 10 over the same secured TLS session used for the outward messages; Secure Enclave 20 verifies the signature and stores the token as the root credential that authorises all subsequent claim submissions. In parallel, the server pushes a confirmation notification to Mobile App 30 (also not depicted in FIG. 2), informing the user that the robot has been successfully insured and is ready for operation.

Security posture and data integrity. Throughout the entire swim-lane sequence, TLS 1.3 with forward secrecy protects every hop. The pairing nonce expires within sixty seconds to defeat QR-code replay attacks, and the registration token is bound to the enclave's hardware key so it cannot be transplanted to another device. If any KYC sub-step fails, Insurance Server 50 withholds the token and Mobile App 30 instructs the user to retry or contact support, thereby preventing an unverified robot from recording or transmitting data.

By coordinating these lane-specific steps, the FIG. 2 workflow guarantees that only a legitimate, identified user can activate recording on a uniquely attested robot, ensuring traceable accountability for every future insurance claim.

Consent & Continuous Recording

Figure 3:
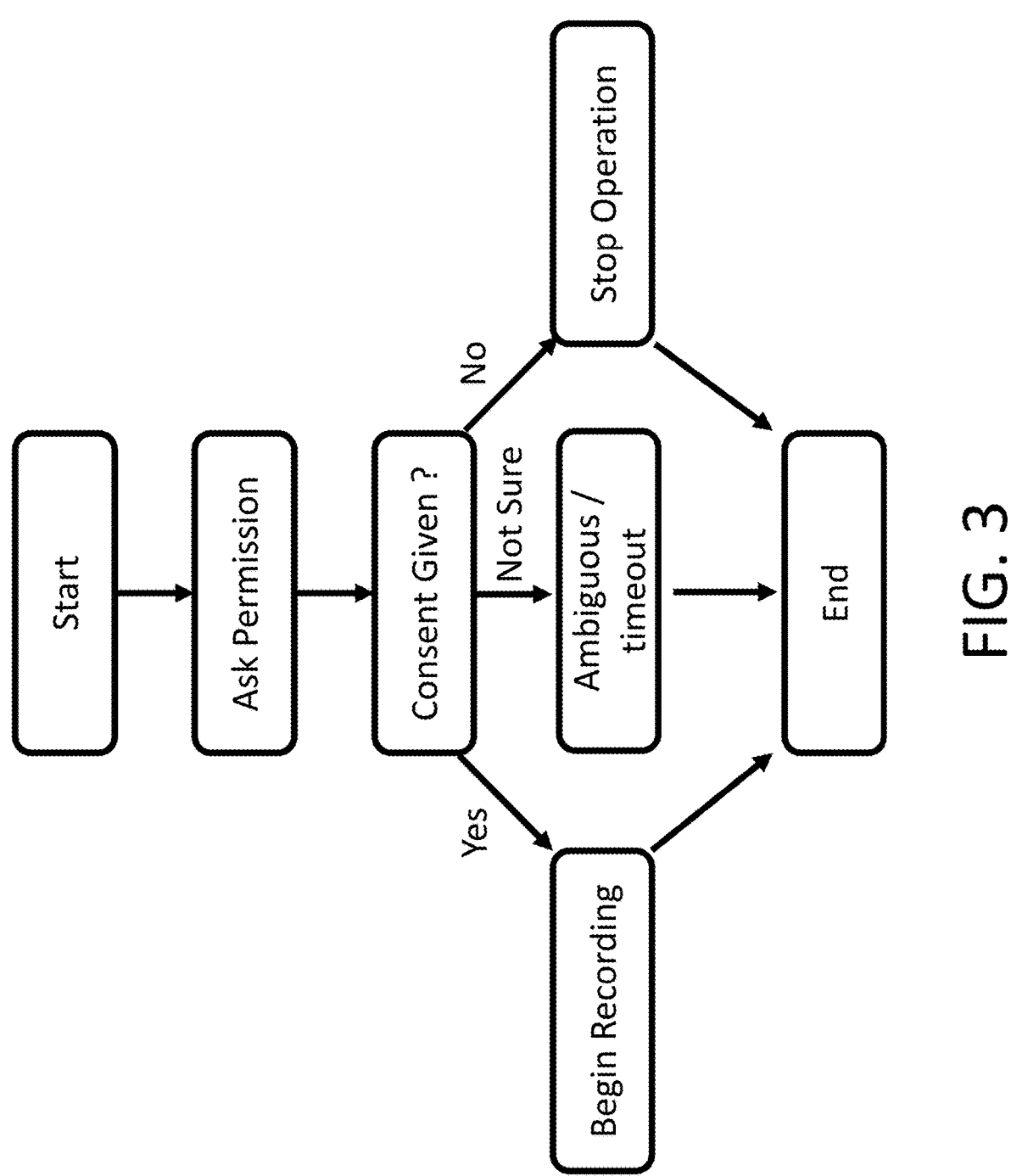
FIG. 3 is a flowchart for obtaining user consent to record.

As per FIG. 3—which is a decision-flow chart dedicated to user consent—the robot follows a legally compliant, opt-in protocol before any audio-video capture is enabled.

Start state. When Robot 10 boots for the very first time after a successful pairing-token install (see FIG. 2), it transitions into the Start block shown at the top of the diagram. Internal diagnostics complete, network time is fetched, and the robot confirms that no prior consent flag exists in non-volatile memory.

Ask Permission. In the second block, Ask Permission, the robot issues an audible consent request—for example, it might ask, "Do I have your permission to record audio and video during operation?"—while simultaneously rendering the same prompt as on-screen text to accommodate hearing-impaired users. A five-second timer then starts; during that interval the surround microphone array 14 streams the spoken reply to Processor 16, whose natural-language-understanding module classifies it as affirmative or negative. The user may alternatively tap Yes or No in Mobile App 30, which feeds the same state machine for consent evaluation.

Decision node—Consent Given? At the consent-decision node, the algorithm evaluates three outcomes:

Affirmative intent. Confidence$>\theta\_yes$ (e.g., 0.85) asserts the record_enabled flag in secure enclave 20 and branches left to Begin Recording.

Negative intent. Confidence$>\theta\_no$ asserts a local record_block latch and branches right to Stop Operation, causing all motors and sensors except the microphone to stand by.

Ambiguous/timeout. Confidence<both thresholds or timer expiry increments an ambiguous counter; after three loops the robot safely powers down and re-prompts at next restart.

Begin Recording branch. An affirmative path launches the secure recording daemon: rolling buffer 24 is mounted, frame hashes are pipelined to secure enclave 20, and status LEDs turn green. Simultaneously, the robot timestamps this event as "Arrival $T_0$" and—starting from that very first operational moment—captures time-synchronised audio and video from all angles, thereby meeting the design goal that the device function as a digital witness "from the moment it arrives." A JSON consent receipt containing user ID, time stamp, locale language code, and audio transcript hash is stored in Policy DB 56 via Insurance Server 50, providing auditability.

Stop Operation branch. A negative path disables all movement actuators, wipes any non-committed sensor frames, and shows an on-screen message outlining how to grant consent later. The mobile app likewise surfaces a Resume Robot button that restarts the flowchart from the top (not shown in FIG. 3).

End state. Both leaf blocks converge into End once the respective actions finish. Crucially, the system remembers the consent outcome: a Yes persists until explicitly revoked in the app or via a new verbal denial, while a No is re-queried after every power cycle to honour dynamic privacy preferences.

By enforcing this FIG. 3 flow, the platform satisfies global privacy statutes—GDPR, CCPA, and similar—while guaranteeing that the robot only transitions into its digital-witness mode after an unambiguous, user-controlled opt-in.

Data Capture & Rolling Buffer

Figure 4:
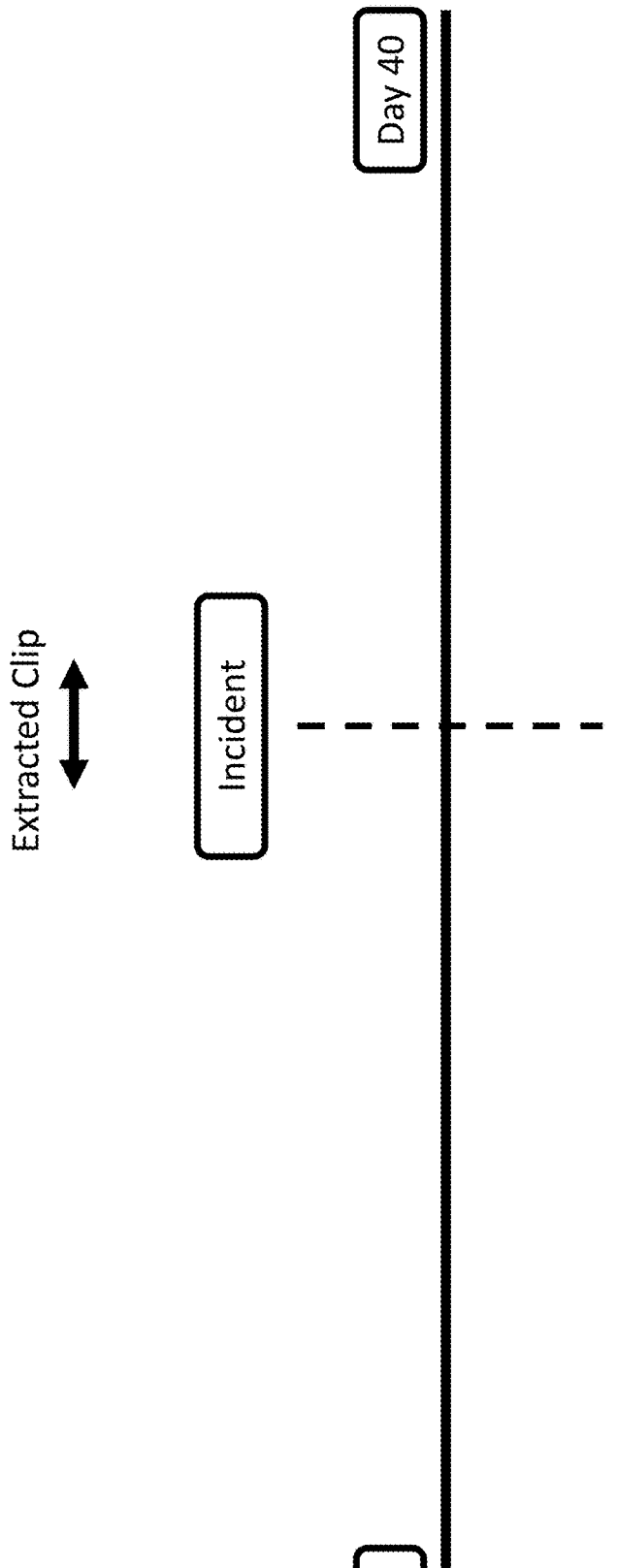
FIG. 4 illustrates a 40-day rolling-buffer timeline and extraction of an incident clip.

As per FIG. 4—which depicts a linear, forty-day timeline annotated with an Incident marker and a bidirectional arrow labelled Extracted Clip—the robot's rolling-buffer subsystem enforces fixed-horizon evidence retention while guaranteeing that only incident-relevant footage is surfaced to the insurer. In other words, the robot keeps a continuous recording for a policy-mandated retention window while providing only incident-relevant footage to the insurer.

Rolling-buffer chronology. The solid horizontal line stretching from Day 0 (left) to Day 40 (right) represents Rolling Buffer 24, a circular, non-volatile flash partition sized to hold up to a policy-mandated continuous retention window—forty days in the present example—of high-definition video plus spatial audio. As new sensor frames arrive, they overwrite the oldest sectors in first-in/first-out order, ensuring that at no time does unclaimed footage exceed the statutory or agreement-mandated limit. Each five-second segment is individually AES-GCM encrypted, stamped with an IETF-compliant UTC time code, and appended with a cumulative SHA-256 hash that processor 16 updates in real time.

Incident detection and clip extraction. The vertical dashed line marked Incident represents the moment an anomaly threshold is crossed-such as an accelerometer spike, sudden altitude change, or a user-initiated event (e.g., selecting Submit Claim in Mobile App 30). Upon this trigger, processor 16 consults a programmable pre/post padding interval (e.g., thirty seconds before to thirty seconds after the incident) and carves out the highlighted region shown by the bidirectional arrow. This extracted clip is pulled intact—without transcoding—from Rolling Buffer 24, avoiding generation loss and preserving original sensor metadata.

Hashing and signature workflow. Immediately after extraction, processor 16 forwards the clip's SHA-256 digest to Secure Enclave 20, which signs the hash with its device-bound private key, thereby creating an immutable fingerprint. Only the signed hash is eligible for blockchain anchoring; the raw payload remains on the robot until the server requests it, reducing bandwidth and exposure.

Lifecycle and privacy safeguards. If a claim is not filed within a retention window (for e.g. forty days of capture), the corresponding sectors in Rolling Buffer 24 are automatically overwritten and the associated hash index is pruned, and a "claim-expired" flag is set in Policy DB 56 so that any later attempt to reference that incident is rejected at claim-intake time; Mobile App 30 simultaneously surfaces a "claim expired" status to the user. This self-expiring design satisfies privacy regimes such as GDPR's data-minimisation principle while still guaranteeing that any footage supporting a timely claim is cryptographically sealed and retrievable.

Through the mechanics illustrated in FIG. 4, the platform strikes a balance between evidentiary availability and user privacy, storing just enough data—and only for long enough—to validate bona fide insurance events.

Secure Enclave, Remote Attestation, and Blockchain Anchoring

As shown in the high-level block diagram of FIG. 1, the trust anchor for the entire platform resides inside Secure Enclave 20, a physically isolated silicon co-processor that lives on the same board as Processor 16. All asymmetric key material is generated and sealed inside this enclave; neither firmware running on Processor 16 nor any external debugger can extract or overwrite those keys. When Robot 10 first powers up, the enclave publishes an X.509-style device certificate whose public key is cross-signed by the robot manufacturer and pre-registered with Insurance Server 50. From that moment, every cryptographic operation that proves clip integrity—or proves that the robot is still running untampered firmware—routes through Secure Enclave 20.

Figure 7:
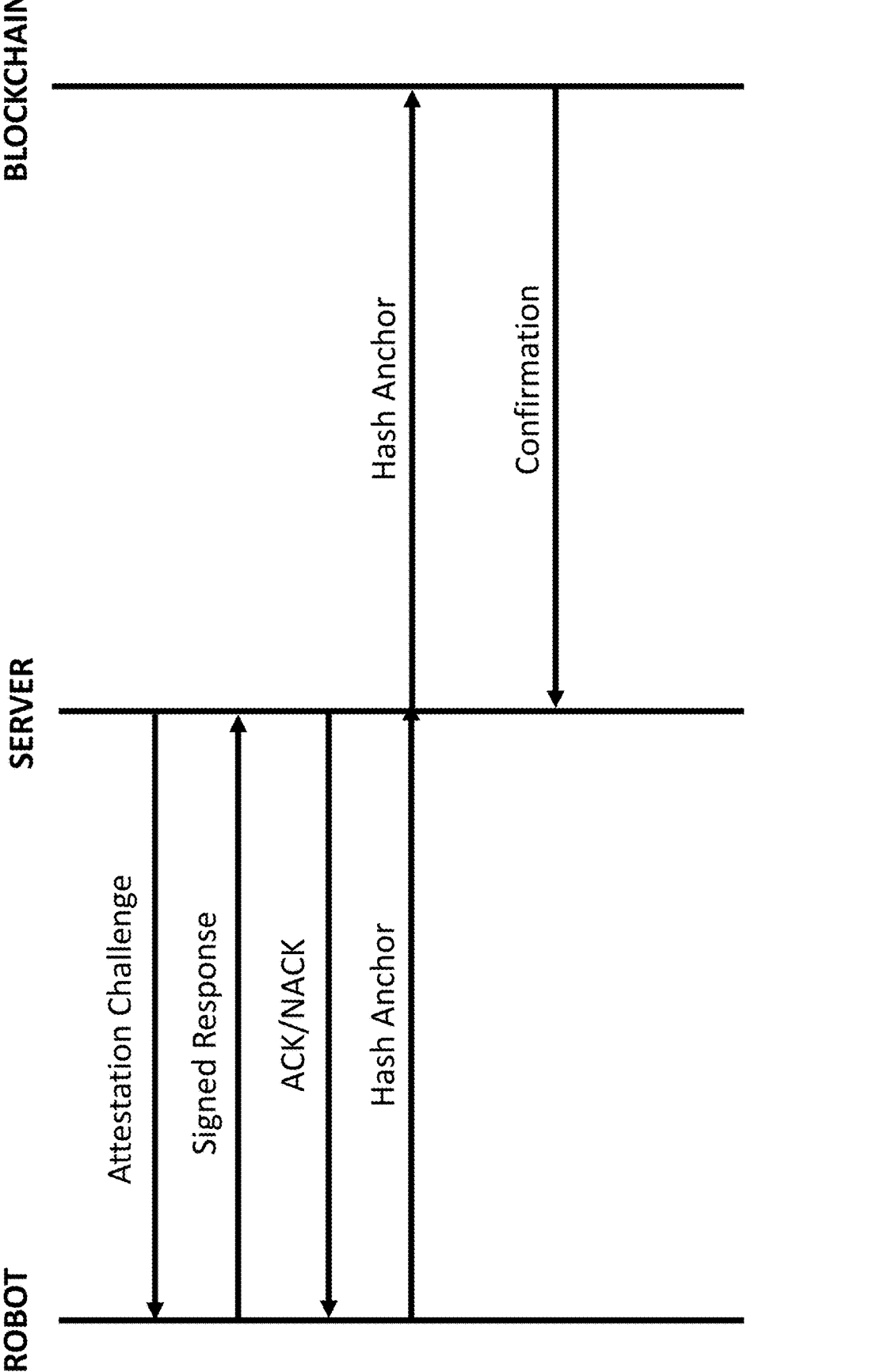
FIG. 7 is a sequence diagram for secure-enclave attestation and blockchain anchoring of evidence.

FIG. 7 expands the single arrow labelled "Robot→Insurance Server" in FIG. 1 into a four-step message sequence that executes before any evidence is accepted. In step 1 Insurance Server 50 transmits an Attestation Challenge—a 256-bit nonce—down to the robot. Step 2 shows Secure Enclave 20 concatenating that nonce with its current firmware-hash (a SHA-256 digest of the read-only code image) and returning a Signed Response that is ECDSA-signed by the enclave's private key. Server 50 verifies the signature and compares the reported firmware hash to a whitelist; any mismatch aborts the claim and flags the policy for manual review. This continuous attestation loop, executed on a daily cadence or immediately before each upload, ensures that malicious parties cannot sideload altered firmware to falsify evidence. The Server 50 informs the Robot 10 about the result of verification check via an ACK/NACK message.

Once attestation succeeds, Processor 16 forwards the SHA-256 digest of the incident clip (generated when the clip was extracted from Rolling Buffer 24) to Secure Enclave 20. The enclave signs that digest; the resulting signature constitutes the hash anchor. This hash anchor is sent by the Robot 10 to the Insurance Server 50. The Insurance Server 50 then transmits this hash anchor to Blockchain 70—depicted in FIG. 1 by the downward link connecting the 'Server 50' block to the 'Blockchain 70' block—using a smart-contract call that returns a transaction identifier. The blockchain's consensus protocol time-stamps the hash inside an immutable block; no raw video ever leaves the robot, preserving user privacy while irrevocably freezing the evidence. When ledger confirmation is received (the implicit return path opposite the downward link in FIG. 1), Server 50 records the transaction ID in Policy DB 56 and only then requests the encrypted clip from Robot 10 to begin analysis in Claim Engine 52.

By interlocking the enclave's hardware-rooted keys (FIG. 1) with a real-time attestation handshake and an external ledger (FIG. 7), the invention guarantees that every evidentiary clip is (i) captured on certified firmware, (ii) cryptographically sealed at the moment of extraction, and (iii) forever verifiable by any third party, even if Insurance Server 50 were later compromised.

Claim Adjudication

Figure 5:
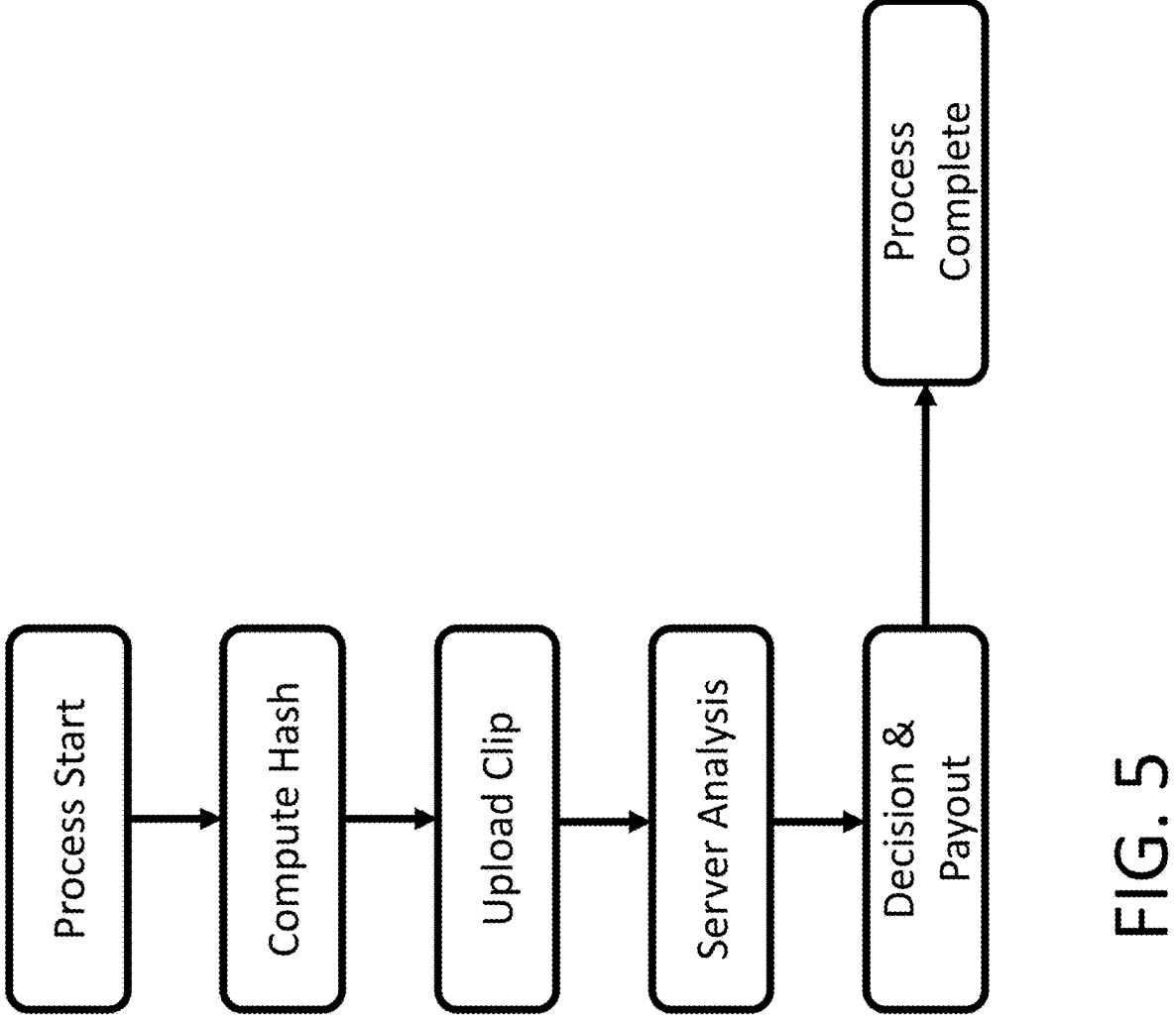
FIG. 5 is a flowchart of claim processing from incident detection to payout.

As per FIG. 5—which in various embodiments is illustrated as a vertical flowchart comprising five sequential blocks from Incident Detected at the top to Decision & Payout at the bottom—the platform may be configured to execute a fully automated claims pipeline that transforms raw sensor footage into an insured remediation event without human adjuster intervention. In this embodiment, the system ingests sensor data, analyzes the footage using automated algorithms, determines causation and liability, and issues a decision and payout without requiring manual review.

In another embodiment, the claims pipeline incorporates human review at one or more stages. For instance, raw sensor footage may be processed by automated components to organize segments, extract relevant frames, and flag portions of interest based on predefined criteria, but a human reviewer, such as an adjuster, investigator, or subject matter expert, examines the organized material to determine the cause of the event and assess the parties and factors responsible. The human reviewer's determinations form the basis for adjudication, with the decision and payout executed accordingly.

In yet another embodiment, the platform operates in a hybrid mode, in which certain stages of the claims pipeline are automated and others require human review. The system may automatically pre-process incoming footage, annotate relevant segments, and suggest preliminary findings, then route the case for human verification and final determination where appropriate. In some configurations, the platform defaults to full automation for routine or unambiguous events, while invoking human intervention for complex, ambiguous, or high-value cases. Similarly, payout amounts may be calculated automatically, determined by a human reviewer, or produced by automated calculation with subsequent human confirmation or adjustment. This hybrid approach combines the efficiency of automated processing with the judgment and discernment of human expertise.

Th detailed description of each block shown in FIG. 5 is provided below:

Incident Detected. The sequence begins when Processor 16 on Robot 10 asserts an anomaly flag—whether from an impact spike indicating an unintentional drop, a thermal-overrun alert signalling potential component failure, or a malicious shove that pushes the robot into a swimming pool—as well as when the user taps Submit Claim in Mobile App 30. The state machine then bundles the event metadata (UTC timestamp, sensor vector, thermal profile, policy ID) and advances the flow to the next processing block.

Compute Hash. Processor 16 extracts the pre- and post-incident window from Rolling Buffer 24 and streams those bytes through a SHA-256 hardware accelerator. The resulting digest is immediately signed in Secure Enclave 20, creating the same hash anchor that has already been committed to Blockchain 70 during the anchoring step described with FIG. 7. Embedding the signed hash here guarantees end-to-end linkage between the physical incident and the later server-side analysis.

Upload Clip. With blockchain confirmation in hand, Robot 10 encrypts the extracted incident clip using a hybrid AES-256/GCM payload protected by an ECDH-derived session key and transmits the ciphertext to Insurance Server 50 over a mutually-authenticated TLS 1.3 channel. Packet-level acknowledgements guarantee loss-free delivery before Rolling Buffer 24 is allowed to overwrite the local copy. Because the clip is pulled directly from Rolling Buffer 24 and its hash has already been anchored on the blockchain, the user is never asked to upload supplemental photos or videos—the mobile app's sole role is to press Submit Claim, after which evidence transfer is fully automated.

Server Analysis. Arriving at Insurance Server 50, the clip's digest is recomputed and compared byte-for-byte with the stored hash anchor; any mismatch aborts processing and flags the claim for forensic review.

In one embodiment, when integrity is confirmed, Claim-Decision Engine 52 invokes a fully automated two-stage analytics pipeline: (i) a rule layer checks simple predicates such as "was the robot submerged?" or "did battery temperature exceed a safe limit?"; and (ii) a convolutional-vision transformer and temporal-audio network jointly classify causation into user misuse, third-party interference, or robot malfunction. Confidence scores must exceed configurable thresholds (e.g., 0.90) or else a human adjuster is alerted for oversight. In this embodiment, payout amounts may also be calculated automatically based on stored policy and claim data.

In another embodiment, the analysis is human-assisted. Upon confirming integrity, Claim-Decision Engine 52 organizes the footage, extracts relevant frames, and generates metadata summaries for review by a human adjuster or other qualified reviewer. Automated components may assist by highlighting anomalies, segmenting the timeline, and retrieving similar historical cases, but the final causation determination—including whether the event resulted from user misuse, third-party interference, or robot malfunction—is made by the human reviewer. In this embodiment, payout amounts may be determined by the human reviewer, optionally assisted by automated tools that propose preliminary values.

In yet another embodiment, a hybrid mode is employed. The server first verifies the digest as described above, then an automated stage applies rule checks and machine-learning models to generate preliminary classifications. A confidence score for a given classification may be determined based on one or more factors, such as the statistical probability output of the machine-learning model, the number of corroborating sensor modalities, the completeness of the incident clip, the quality or resolution of the footage, and the consistency of detected features across multiple frames or time intervals. Cases meeting or exceeding a configurable confidence threshold are resolved automatically, while lower-confidence or ambiguous cases are routed to a human reviewer for verification, supplemental analysis, or reclassification. In this embodiment, payout amounts may likewise be calculated automatically, determined entirely by a human, or initially generated by automation for human confirmation or adjustment. This hybrid configuration provides the efficiency of automation for routine claims while retaining the discernment of human expertise for complex scenarios.

Decision & Payout. On a positive coverage determination, the outcome, causal class, and payout amount are written into Policy DB 56 and simultaneously published as an event to the insurer's orchestration bus. As described earlier, the positive coverage determination may be produced automatically by the Claim-Decision Engine 52, generated by a human reviewer, or resulting from a combination of automated analysis and human oversight. Depending on policy tier, the bus triggers (i) a field-service ticket for repair technicians, (ii) a warehouse pick-and-ship order for a replacement robot, or (iii) an ACH credit to the insured's bank account. In some embodiments, the decision rationale recorded in Policy DB 56 and transmitted to the orchestration bus may include annotations or comments from a human reviewer, machine-generated analytics, or both. Mobile App 30 receives a push notification with claim number, decision rationale, and expected resolution timeline, thereby closing the claims-processing loop illustrated in FIG. 5.

Through these five tightly linked stages, the invention converts tamper-proof sensor evidence into near-real-time financial remediation, slashing settlement latency from weeks to minutes while virtually eliminating fraudulent submissions.

Robot Hardware Stack

Figure 6:
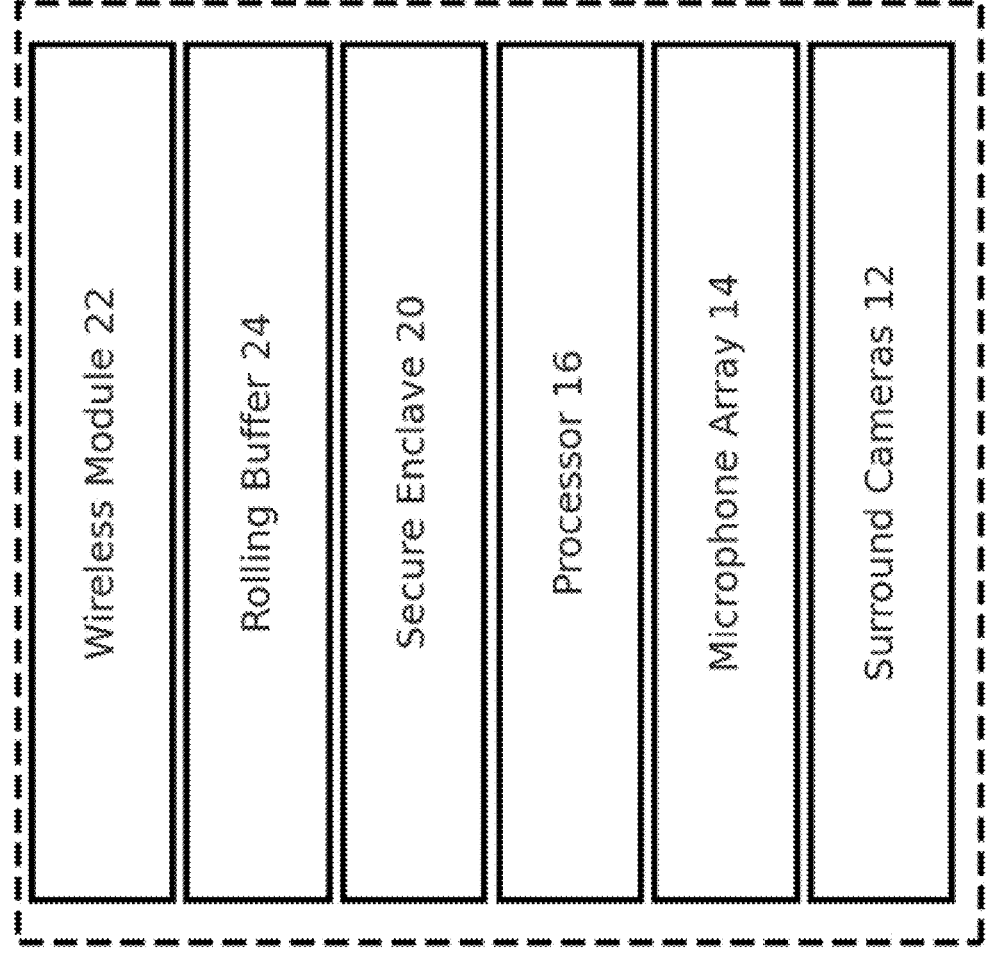
FIG. 6 depicts the robot hardware stack, including sensors (12, 14), processor (16), secure enclave (20), rolling buffer (24), and wireless module (22).

As per FIG. 6—which is a cut-away, vertically layered "exploded-stack" diagram drawn inside a dashed outline of the robot chassis—the invention organises every critical board-level component of Robot 10 into a bottom-up trust hierarchy that funnels raw sensor data upward through progressively stronger security controls before any external interface is reached. The component specifications provided below for the elements illustrated in FIG. 6 are exemplary only; the stated values may be scaled, modified, or replaced with functionally equivalent alternatives without departing from the scope of the invention.

Surround Cameras 12 (bottom layer). The stack begins with an annular ring of 4K fisheye cameras mounted at ankle level and on the robot's head; these units supply a 360-degree video panorama at 30 fps. Each module carries an infrared LED pair for low-light capture and feeds uncompressed YUV frames onto a PCIe/CSI high-speed video bus that runs vertically to the next layer. Mounting the cameras at the physical bottom of the stack isolates image sensors from electromagnetic noise produced by higher compute layers.

Microphone Array 14 (second layer). Immediately above the imaging plane sits a six-element MEMS microphone board arranged in a cardioid geometry. The microphones sample at 48 KHz and output digital PDM signals that are beam-formed in hardware to create a spatial audio channel that is time-synchronised—within ±2 μs—to the video stream. The shared clock domain ensures that audiovisual clips remain forensically admissible.

Processor 16 (third layer). Next is the main heterogeneous system-on-chip comprising four ARM Cortex-A78 CPU cores, a CUDA-capable GPU, and a 5-TOPS neural-network accelerator. Firmware on this device executes perception, SLAM, impact detection, AES-256 video encryption, and scheduling for higher-priority security interrupts generated by Secure Enclave 20. A dedicated thermal pipe vents heat laterally so that rising convection does not distort the microphone array.

Secure Enclave 20 (fourth layer). Bolted atop the processor board, and sharing only a minimal QSPI bus, is a tamper-resistant co-processor fabricated with on-die fuses, side-channel shields, and secure-erase circuitry. The enclave owns the root ECDSA key, generates the X.509 device certificate, signs every rolling-buffer hash, and services remote-attestation challenges (see FIG. 7). Its placement above Processor 16 lets the enclave sever the data path if firmware integrity checks fail, effectively "cutting the stack" before any signed material can be forged.

Rolling Buffer 24 (fifth layer). A 256-GB eMMC module soldered on an interposer board holds the circular, continuous forty-day evidence cache. The buffer receives data exclusively through a DMA channel authorised by Secure Enclave 20; any user-space process running on Processor 16 lacks the privileges to overwrite a signed segment. The board includes an accelerometer that detects physical removal; if the rolling-buffer module is dislodged, Secure Enclave 20 securely erases its cryptographic keys, rendering any captured data useless to an attacker.

Wireless Module 22 (top layer). Crowning the stack is a Wi-Fi 6E/LTE combo card with its own secure boot ROM and signed firmware updates. All data leaving the chassis must pass upward through the buffer, the enclave, and then this interface, ensuring that outbound packets carry authenticated, enclave-signed hashes. Shield cans and RF gaskets physically isolate radio emissions from the lower layers so that side-channel attacks cannot glean cryptographic material by analysing wireless-power fluctuations.

Vertical trust path and attack surface minimisation. The upward flow—from sensors→processor→enclave→storage→radio—creates a one-directional, hardware-enforced pipeline. Should an adversary compromise Wireless Module 22 or even gain root on Processor 16, they cannot retroactively alter footage stored beneath Secure Enclave 20, nor can they forge new clip signatures without the enclave's private key. Conversely, if sensors are physically obstructed or replaced, the processor's real-time self-tests will raise integrity flags long before any signed hash is issued, preserving evidentiary quality.

By layering components in the manner illustrated in FIG. 6, the invention achieves both electromagnetic and logical compartmentalisation, ensuring that security-critical operations remain insulated from less-trusted networking code while preserving the high-bandwidth data paths required for continuous, high-definition evidence capture.

TECHNICAL ADVANTAGES OF THE INVENTION

The disclosed digital-witness insurance architecture confers a constellation of interlocking technical benefits that collectively surpass the capabilities of conventional claim-handling systems. Because Robot 10 continuously records with a surround-camera ring and beam-forming microphone array that are hardware-clock-synchronised, every incident is captured as a high-fidelity, 360-degree evidentiary record whose provenance is independent of human testimony or recollection. Those raw frames are sealed inside a secure enclave before they ever reach removable storage or a network interface; the enclave's device-rooted keys sign each rolling hash, and the signed digest is time-stamped on a permissioned blockchain, rendering subsequent forgery or selective editing mathematically infeasible. This cryptographic chain of custody means insurers can rely on the footage without dispatching adjusters for manual site inspections, thereby compressing a settlement cycle that formerly spanned weeks or months into a largely autonomous, minutes-long decision.

Equally important, the system's edge-to-cloud partitioning transmits only incident-specific clips—never the full sensor backlog—so bandwidth usage and privacy exposure remain minimal even under continuous recording. A forty-day rolling buffer automatically shreds obsolete sectors, and the robot will not activate its cameras until an explicit verbal or in-app consent is logged, satisfying GDPR, CCPA, and similar data-minimisation statutes. On the server side, a machine-learning claim engine adjudicates causation with deterministic audit trails, slashing false-claim rates while boosting transparency for policy-holders, who can monitor every step through the same mobile application that onboards the robot. By fusing tamper-evident hardware, immutable ledger anchoring, AI-driven analytics, and user-centric privacy controls, the invention delivers real-time, bias-free evidence, lowers operating costs for insurers, and broadens access to coverage for robotic assets—all without requiring the customer to assemble or upload a single document.

CONCLUSION

The foregoing specification has set forth a representative, end-to-end embodiment of a digital-witness insurance system that integrates secure robotic sensing, hardware-rooted cryptography, blockchain anchoring, and AI-driven claims processing to deliver objective, privacy-compliant evidence and near-real-time claim resolution. By fusing on-board secure sensing, consent-aware recording, cryptographically verifiable storage, and AI-driven claims analysis, the disclosed system re-defines robotic accountability and insurance efficiency, creating a technical improvement over conventional, paperwork-based claim workflows. By marrying the robot's native 360-degree perception hardware with a tamper-resistant secure enclave and a permissioned or public distributed ledger, the invention closes the evidentiary gap that has historically plagued robot-related liability. Although the architecture has been illustrated with specific hardware tiers, data-retention windows, and analytic pipelines, those parameters can be re-scaled, re-ordered, or substituted with functionally equivalent components—such as alternative hashing algorithms, different machine-learning models, or distinct ledger technologies—without departing from the spirit and scope of the invention. Accordingly, the present disclosure is not limited to the particular forms described, but embraces all modifications and variations that fall within the ambit of the following claims.

The invention claimed is:

1. A digital-witness robotic insurance system comprising:
a mobile robot that includes
at least one surround video camera and at least one spatial microphone operable to generate synchronized audio-video sensor data;
a processor operably coupled to the camera and microphone;
a secure enclave disposed on the same circuit board as the processor and operable to (i) generate and store a non-exportable private signing key, (ii) sign a cryptographic hash of the sensor data, and (iii) respond to an attestation challenge;
an encrypted, non-volatile rolling buffer coupled to the secure enclave and arranged as a circular queue sized to store only a most-recent portion of the signed sensor data, wherein the rolling buffer is dimensioned to overwrite its oldest sectors such that only data captured within a policy-mandated retention window are retained; and
a wireless communication module operable to transmit data over a transport-layer-security connection;
a mobile application executable on a user device and operable to (i) pair the mobile robot to a registered user by scanning a device identifier displayed by the robot, and (ii) relay an identity-verification artefact containing user demographic information to a remote server;
an insurance server comprising a claim-decision engine and a policy database, the insurance server being operable to
issue an attestation challenge containing a nonce to the secure enclave,
receive a signed response from the secure enclave and verify firmware integrity,
receive an incident clip extracted from the rolling buffer together with the signed cryptographic hash,
authenticate integrity of the incident clip using the signed cryptographic hash, and
execute the claim-decision engine to determine a coverage outcome; and
a distributed-ledger node operable to store, as an immutable record, the signed cryptographic hash as a hash anchor referenced by the insurance server, wherein the insurance server, upon a positive coverage outcome, automatically initiates at least one remediation action selected from (i) dispatching a repair technician, (ii) shipping a replacement robot, or (iii) issuing an electronic monetary reimbursement, thereby providing tamper-resistant, real-time evidence without requiring a policy-holder to upload external documentation.

2. The system of claim 1, wherein the secure enclave signs the cryptographic hash using an elliptic-curve digital-signature algorithm and publishes an X.509 device certificate cross-signed by a robot manufacturer.

3. The system of claim 1, wherein the distributed-ledger node is a permissioned blockchain network and the insurance server records a consensus confirmation time-stamp for the hash anchor in the policy database.

4. The system of claim 1, wherein the claim-decision engine executes a machine-learning model that combines convolutional visual features and temporal audio features to classify causation among user misuse, third-party interference, and robot malfunction.

5. The system of claim 1, wherein the insurance server, upon determining that no claim has been filed within policy-mandated retention window, sets a claim-expired flag in the policy database and rejects any subsequently submitted claim that references the overwritten sensor data.

6. The system of claim 1, wherein the rolling buffer includes an accelerometer operable to trigger a key-zeroization routine in the secure enclave when physical removal of the rolling-buffer memory module is detected.

7. The system of claim 1, wherein the processor encrypts the incident clip using AES-GCM with a session key derived through an elliptic-curve Diffie-Hellman exchange performed between the mobile robot and the insurance server prior to transmission of the incident clip.

8. A computer-implemented method for providing digital-witness insurance coverage to a mobile robot, the method comprising:
registering, by a mobile application executing on a user device, a policy-holder by collecting user demographic data and pairing the policy-holder to a physical robot via a device identifier scanned from the robot;
generating, within a secure enclave located on a circuit board of the robot, a non-exportable private signing key and an X.509 device certificate;
obtaining explicit user consent to record and, in response, continuously capturing synchronized audio-video sensor data with at least one surround camera and at least one spatial microphone;
encrypting and storing the captured sensor data in a circular rolling buffer while concurrently computing a cryptographic hash of the sensor data and signing the hash inside the secure enclave, wherein the rolling buffer is dimensioned to overwrite its oldest sectors such that only data captured within a policy-mandated retention window are retained;
upon detection of an incident or receipt of a user-initiated claim command, extracting an incident clip from the rolling buffer and forwarding a digest of the incident clip to the secure enclave for signature;
transmitting the signed digest from an insurance server to a distributed-ledger node, thereby anchoring the digest as an immutable hash record and receiving a confirmation time-stamp;
after receiving the confirmation time-stamp, transmitting an encrypted version of the incident clip from the robot to the insurance server;

verifying, at the insurance server, integrity of the incident clip by comparing a freshly computed hash with the anchored digest;

executing, at the insurance server, a claim-decision engine to determine a coverage outcome; and automatically initiating, when the coverage outcome is positive, at least one remediation action selected from dispatching a repair technician, shipping a replacement robot, or issuing an electronic monetary reimbursement.

9. The method of claim 8, further comprising issuing, from the insurance server to the secure enclave, an attestation challenge containing a nonce, receiving a signed response that includes a firmware hash, and verifying firmware integrity prior to accepting any incident clip.

10. The method of claim 8, wherein anchoring the signed digest comprises recording the digest on a permissioned blockchain network and logging the resulting consensus confirmation time-stamp in a policy database.

11. The method of claim 8, wherein determining the coverage outcome comprises applying a machine-learning model that combines convolutional visual features and temporal audio features to classify causation among user misuse, third-party interference, and robot malfunction.

12. The method of claim 8, further comprising, when no claim is filed within the policy-mandated retention window, overwriting the corresponding sectors in the rolling buffer, setting a claim-expired flag in the policy database, and rejecting any subsequently submitted claim that references the overwritten sensor data.

13. The method of claim 8, wherein transmitting the incident clip comprises encrypting the clip with AES-GCM using a session key derived through an elliptic-curve Diffie-Hellman exchange performed between the robot and the insurance server.

14. The method of claim 8, further comprising detecting physical removal of the rolling-buffer memory module with an accelerometer and, in response, causing the secure enclave to securely erase its cryptographic keys, thereby rendering stored data unreadable.

15. A digital-witness robotic insurance system comprising:

a mobile robot that includes at least one surround video camera and at least one spatial microphone operable to generate synchronized audio-video sensor data;

a processor operably coupled to the camera and microphone;

a secure enclave disposed on the same circuit board as the processor and operable to (i) generate and store a non-exportable private signing key, (ii) sign a cryptographic hash of the sensor data, and (iii) respond to an attestation challenge;

an encrypted, non-volatile rolling buffer coupled to the secure enclave and arranged as a circular queue sized to store only a most-recent portion of the signed sensor data; and a wireless communication module operable to transmit data over a transport-layer-security connection;

a mobile application executable on a user device and operable to (i) pair the mobile robot to a registered user by scanning a device identifier displayed by the robot, and (ii) relay an identity-verification artefact containing user demographic information to a remote server;

an insurance server comprising a claim-decision engine and a policy database, the insurance server being operable to issue an attestation challenge containing a nonce to the secure enclave, receive a signed response from the secure enclave and verify firmware integrity, receive an incident clip extracted from the rolling buffer together with the signed cryptographic hash, authenticate integrity of the incident clip using the signed cryptographic hash, and execute the claim-decision engine to determine a coverage outcome; and a distributed-ledger node operable to store, as an immutable record, the signed cryptographic hash as a hash anchor referenced by the insurance server, wherein the insurance server, upon a positive coverage outcome, facilitates initiation of at least one remediation action selected from (i) dispatching a repair technician, (ii) shipping a replacement robot, or (iii) issuing an electronic monetary reimbursement, the initiation being performed by a human reviewer or by an automated system subject to human confirmation, thereby providing tamper-resistant, real-time evidence without requiring a policy-holder to upload external documentation; wherein raw sensor footage is processed by automated components to organize segments, extract relevant frames, and flag portions of interest based on predefined criteria, the system being further configured to enable human-assisted review of the flagged portions to determine a cause of the event and assess parties and factors responsible.

16. The system of claim 15, wherein the rolling buffer is dimensioned to overwrite its oldest sectors such that only data captured within a policy-mandated retention window are retained.

17. The system of claim 15, wherein the insurance server calculates a confidence score for the incident clip, and the incident clip having the confidence score below a configurable confidence threshold or identified as ambiguous by the system is routed to a human reviewer for verification, supplemental analysis, or reclassification.

\* \* \* \* \*